United States Patent
Lu

(10) Patent No.: US 8,391,034 B2
(45) Date of Patent: Mar. 5, 2013

(54) POWER SUPPLY MODULE WITH FILTERING CIRCUIT AND POWER SUPPLY MODULE ASSEMBLY

(75) Inventor: Jian-Hui Lu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 503 days.

(21) Appl. No.: 12/727,239

(22) Filed: Mar. 19, 2010

(65) Prior Publication Data
US 2010/0254164 A1 Oct. 7, 2010

(30) Foreign Application Priority Data
Apr. 1, 2009 (CN) .......................... 2009 1 0301284

(51) Int. Cl.
*H02H 7/122* (2006.01)
(52) U.S. Cl. ........................................... 363/55; 363/40
(58) Field of Classification Search .............. 363/39–43, 363/50, 51, 55–58, 95–98
See application file for complete search history.

(56) References Cited

U.S. PATENT DOCUMENTS

| 4,307,441 | A | * | 12/1981 | Bello | 363/25 |
| 4,864,481 | A | * | 9/1989 | Osman | 363/21.17 |
| 7,262,559 | B2 | | 8/2007 | Tripathi et al. | |
| 7,714,518 | B2 | * | 5/2010 | Wong et al. | 315/291 |
| 8,199,532 | B2 | * | 6/2012 | Grande et al. | 363/21.01 |

* cited by examiner

*Primary Examiner* — Jessica Han
(74) *Attorney, Agent, or Firm* — Altis Law Group, Inc.

(57) ABSTRACT

A power supply module includes an AC/DC converter, a voltage transforming circuit, a feedback circuit, and a filtering circuit. The AC/DC converter is used for converting the AC voltage to a primary DC voltage. The voltage transforming circuit is configured for transforming the primary DC voltage to the first DC voltage. The voltage transforming circuit includes a transformer, the transformer includes a primary winding. The feedback circuit is coupled to the primary winding of the transformer and is configured for sampling a current flowing through the primary winding to generate a feedback signal; and the filtering circuit is structured and arranged for filtering any surge voltage transmitted from the feedback circuit to the voltage transforming circuit. Wherein the voltage transforming circuit maintains the first DC voltage at a predetermined value according to the feedback signal. A related power supply module assembly is also provided.

17 Claims, 2 Drawing Sheets

POWER SUPPLY MODULE WITH FILTERING CIRCUIT AND POWER SUPPLY MODULE ASSEMBLY

BACKGROUND

1. Technical Field

The disclosed embodiments relate to power supply modules, and more particularly to a power supply module with a feedback circuit and a filtering circuit.

2. Description of Related Art

A power supply module is typically used to receive and process an alternating current (AC) voltage from an external power source, and generate a first direct current (DC) voltage to power an electronic device.

Generally, this kind of power supply module includes an AC/DC converter, a voltage transforming circuit, and a feedback circuit. The AC/DC converter is used for converting the AC voltage to a primary DC voltage. The voltage transforming circuit includes a transformer. The voltage transforming circuit is used for transforming the primary DC voltage to the first DC voltage. The feedback circuit is used for sampling a current flowing through a primary winding of the transformer to generate a feedback signal. The voltage transforming circuit maintains the first DC voltage at a predetermined value according to the feedback signal.

However, sometimes the feedback circuit can generate a surge voltage due to electromagnetic interference. The surge voltage is sometimes transmitted to the voltage transforming circuit and may damage the voltage transforming circuit.

What is needed, therefore, is a power supply module to overcome the above described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
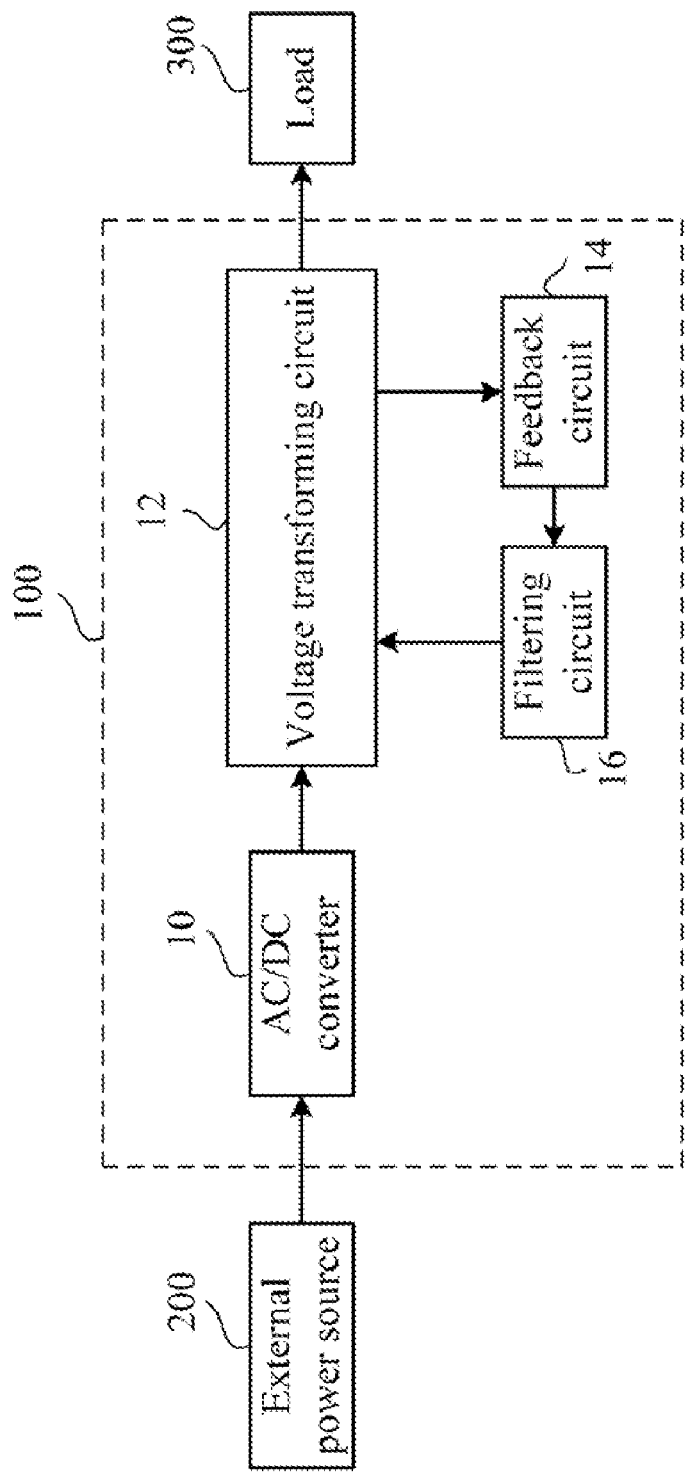
FIG. 1 is a block diagram of a power supply module in accordance with an exemplary embodiment.

Referring to FIG. 1, a power supply module 100 in accordance with an exemplary embodiment is illustrated. The power supply module 100 is used for converting an alternating current (AC) voltage from an external power source 200 to a first direct current (DC) voltage, and applying the first DC voltage to a load 300. The power supply module 100 and the load 300 constitutes a power supply module assembly. The power supply module 100 includes an AC/DC converter 10, a voltage transforming circuit 12, a feedback circuit 14, and a filtering circuit 16.

The AC/DC converter 10 is coupled to the external power source 200. The AC/DC converter 10 is used for converting the AC voltage to a primary DC voltage, and providing the primary DC voltage to the voltage transforming circuit 12.

The voltage transforming circuit 12 is coupled to the AC/DC converter 10. The voltage transforming circuit 12 is used for transforming the primary DC voltage to the first DC voltage, wherein the first DC voltage is used to power the load 300. In detail, referring to FIG. 2, the voltage transforming circuit 12 includes a transformer T1, and the transformer T1 includes a primary winding L1 and a secondary winding L2.

The feedback circuit 14 is coupled to the primary winding, and is used for sampling a current flowing through the primary winding to generate a feedback signal. The voltage transforming circuit 12 maintains the first DC voltage at a predetermined value according to the feedback signal.

The filtering circuit 16 is used for filtering any surge voltage transmitted from the feedback circuit 14 to the voltage transforming circuit 12. Such surge voltage may occur due to electromagnetic interference. Because the surge voltage is filtered, it cannot be transmitted to the voltage transforming circuit 12, and the voltage transforming circuit 12 is effectively protected.

Figure 2:
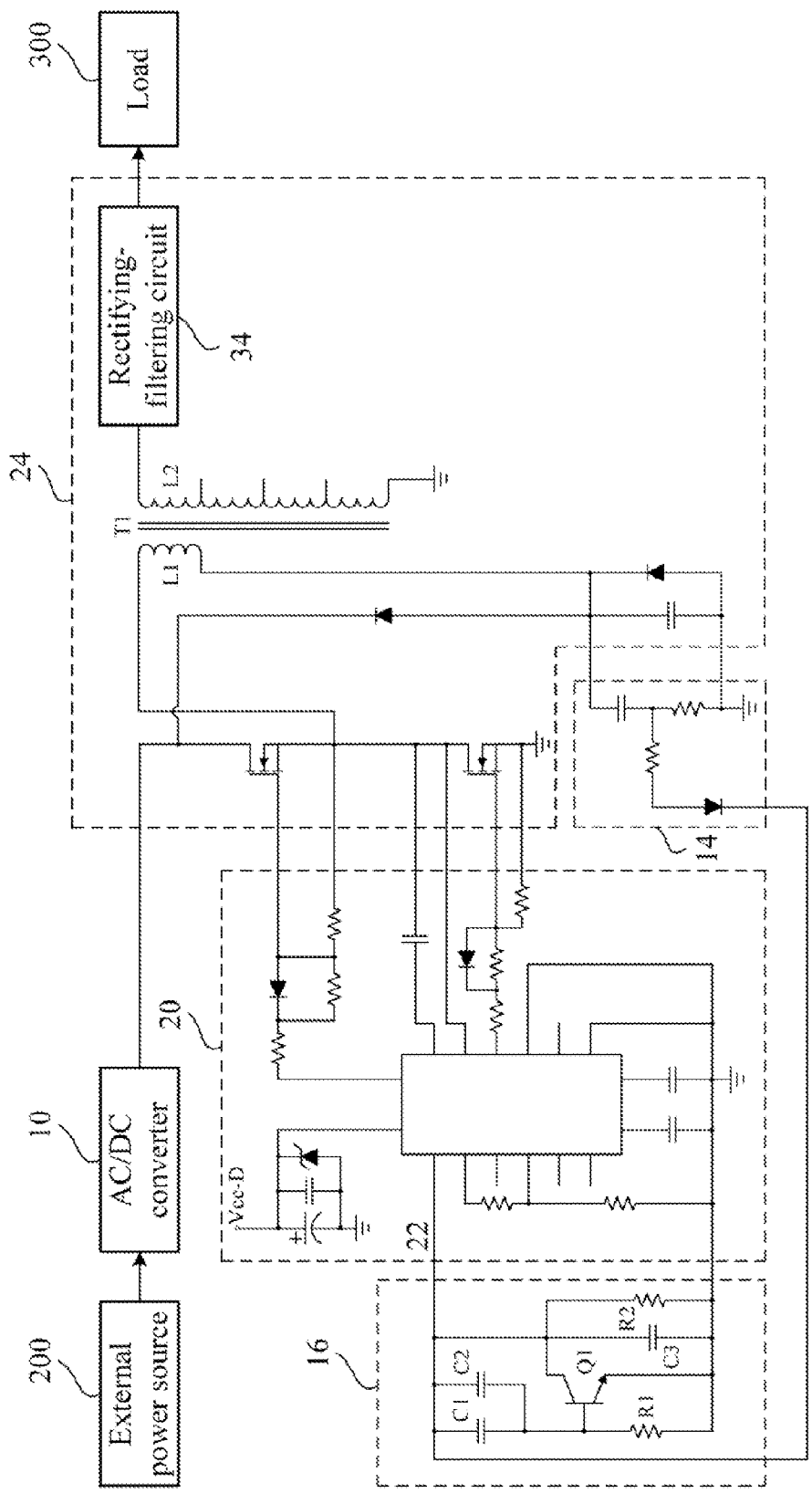
FIG. 2 is a circuit diagram of the power supply module of FIG. 1 in accordance with the exemplary embodiment.

Referring to FIG. 2, the voltage transforming circuit 12 includes a pulse width modulation (PWM) unit 20 and a voltage transforming unit 24. The PWM unit 20 includes a feedback pin 22. The voltage transforming unit 24 is coupled to the PWM unit 20 and is used for transforming the primary DC voltage to the first DC voltage according to a PWM signal outputted from the PWM unit 20. The voltage transforming unit 24 includes the transformer T1 and a rectifying-filtering circuit 34. The transformer T1 includes the primary winding L1 and the secondary winding L2. One end of the secondary winding L2 is coupled to the load 300 through the rectifying-filtering circuit 34, the other end of the secondary winding L2 is grounded.

The filtering circuit 16 includes a first capacitor C1, a second capacitor C2, a third capacitor C3, a first resistor R1, a second resistor R2, and a transistor Q1. One end of the first capacitor C1 is coupled between the feedback pin 22 and the feedback circuit 14. The other end of the first capacitor C1 is coupled to a base of the transistor Q1. The second capacitor C2 is coupled in parallel with the first capacitor C1. The base of the transistor Q1 is grounded through the first resistor R1. A collector of the transistor Q1 is coupled between the feedback pin 22 and the feedback circuit 14, and an emitter of the transistor Q1 is grounded. One end of the third capacitor C3 is coupled to the collector of the transistor Q1, the other end of the third capacitor C3 is grounded. The second resistor R2 is coupled in parallel with the third capacitor C3.

The principal of the power supply module 100 is described as follows. When the feedback circuit 14 generates a surge voltage due to, e.g., an electromagnetic interference, the surge voltage is transmitted to the base of the transistor Q1, the transistor Q1 is turned on, and the feedback pin 22 is grounded. Therefore the surge voltage is filtered by the filtering circuit 16 and can not be transmitted to the PWM unit 20 through the feedback pin 22, and the PWM unit 20 is effectively protected.

Further of alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. A power supply module configured for converting an alternating current (AC) voltage to a first direct current (DC) voltage and applying the first DC voltage to a load, the power supply module comprising:

an AC/DC converter for converting the AC voltage to a primary DC voltage;

a voltage transforming circuit configured for transforming the primary DC voltage to the first DC voltage, the voltage transforming circuit comprising a transformer, the transformer comprising a primary winding;

a feedback circuit coupled to the primary winding of the transformer and configured for sampling a current flowing through the primary winding to generate a feedback signal; and a filtering circuit structured and arranged for filtering any surge voltage transmitted from the feedback circuit to the voltage transforming circuit;

wherein the voltage transforming circuit maintains the first DC voltage at a predetermined value according to the feedback signal; the filtering circuit comprises a first capacitor, a first resistor, and a transistor, one end of the first capacitor is coupled between the feedback circuit and the voltage transforming circuit, the other end of the first capacitor is coupled to a base of the transistor, the base of the transistor is grounded through the first resistor, a collector of the transistor is coupled between the feedback circuit and the voltage transforming circuit, and an emitter of the transistor is grounded.

2. The power supply module of claim 1, wherein the voltage transforming circuit further comprises a rectifying-filtering circuit, the transformer further comprises a secondary winding, one end of the secondary winding is capable of being coupled to the load through the rectifying-filtering circuit, and the other end of the secondary winding is capable of being grounded.

3. The power supply module of claim 1, wherein the voltage transforming circuit further comprises a pulse width modulation (PWM) unit and a voltage transforming unit coupled to the PWM unit, the voltage transforming unit is configured for transforming the primary DC voltage to the first DC voltage according to a PWM signal outputted from the PWM unit, the filtering circuit is coupled between the feedback circuit and the PWM unit and is structured and arranged for filtering the any surge voltage transmitted from the feedback circuit to the PWM unit.

4. The power supply module of claim 1, wherein the filtering circuit further comprises a second capacitor, and the second capacitor is coupled in parallel with the first capacitor.

5. The power supply module of claim 4, wherein the filtering circuit further comprises a third capacitor, one end of the third capacitor is coupled to the collector of the transistor, and the other end of the third capacitor is coupled to the emitter of the transistor.

6. The power supply module of claim 1, wherein the filtering circuit further comprises a second resistor, one end of the second resistor is coupled to the collector of the transistor, and the other end of the second resistor is coupled to the emitter of the transistor.

7. A power supply module, comprising:
an alternating current/direct current (AC/DC) converter for converting an AC voltage to a primary DC voltage;
a voltage transforming circuit; the voltage transforming circuit comprising a pulse width modulation (PWM) unit and a voltage transforming unit, the voltage transforming unit comprising a transformer, the voltage transforming unit coupled to the PWM unit and configured for transforming the primary DC voltage to a first DC voltage according to a PWM signal outputted from the PWM unit, and the transformer comprising a primary winding;
a feedback circuit structured and arranged for sampling a current flowing through the primary winding of the transformer to generate a feedback signal; and a filtering circuit coupled between the feedback circuit and the PWM unit and configured for filtering any surge voltage transmitted from the feedback circuit to the PWM unit;

wherein the voltage transforming circuit maintains the first DC voltage at a predetermined value according to the feedback signal, the filtering circuit comprises a first capacitor, a first resistor, and a transistor, one end of the first capacitor is coupled between the feedback circuit and the PWM unit, the other end of the first capacitor is coupled to a base of the transistor, the base of the transistor is capable of being grounded through the first resistor, a collector of the transistor is coupled between the feedback circuit and the PWM unit, and an emitter of the transistor is capable of being grounded.

8. The power supply module of claim 7, wherein the voltage transforming circuit further comprises a rectifying-filtering circuit, the transformer further comprises a secondary winding, one end of the secondary winding is capable of being coupled to the load through the rectifying-filtering circuit, and the other end of the secondary winding is capable of being grounded.

9. The power supply module of claim 7, wherein the filtering circuit further comprises a second capacitor, and the second capacitor is coupled in parallel with the first capacitor.

10. The power supply module of claim 9, wherein the filtering circuit further comprises a third capacitor, one end of the third capacitor is coupled to the collector of the transistor, and the other end of the third capacitor is coupled to the emitter of the transistor.

11. The power supply module of claim 7, wherein the filtering circuit further comprises a second resistor, one end of the second resistor is coupled to the collector of the transistor, and the other end of the second resistor is coupled to the emitter of the transistor.

12. A power supply module assembly comprising a power supply module and a load, the power supply module configured for converting an alternating current (AC) voltage to a first direct current (DC) voltage and applying the first DC voltage to the load, the power supply module comprising:
an AC/DC converter for converting the AC voltage to a primary DC voltage;
a voltage transforming circuit configured for transforming the primary DC voltage to the first DC voltage, the voltage transforming circuit comprising a transformer, the transformer comprising a primary winding;
a feedback circuit coupled to the primary winding of the transformer and configured for sampling a current flowing through the primary winding to generate a feedback signal; and
a filtering circuit structured and arranged for filtering any surge voltage transmitted from the feedback circuit to the voltage transforming circuit;
wherein the voltage transforming circuit maintains the first DC voltage at a predetermined value according to the feedback signal; the filtering circuit comprises a first capacitor, a first resistor, and a transistor, one end of the first capacitor is coupled between the feedback circuit and the voltage transforming circuit, the other end of the first capacitor is coupled to a base of the transistor, the base of the transistor is grounded through the first resistor, a collector of the transistor is coupled between the feedback circuit and the voltage transforming circuit, and an emitter of the transistor is grounded.

13. The power supply module assembly of claim 12, wherein the voltage transforming circuit further comprises a rectifying-filtering circuit, the transformer further comprises a secondary winding, one end of the secondary winding is capable of being coupled to the load through the rectifying-filtering circuit, and the other end of the secondary winding is capable of being grounded.

14. The power supply module assembly of claim 12, wherein the voltage transforming circuit further comprises a pulse width modulation (PWM) unit and a voltage transforming unit coupled to the PWM unit, the voltage transforming unit is configured for transforming the primary DC voltage to the first DC voltage according to a PWM signal outputted from the PWM unit, the filtering circuit is coupled between the feedback circuit and the PWM unit and is structured and arranged for filtering the any surge voltage transmitted from the feedback circuit to the PWM unit.

15. The power supply module assembly of claim 12, wherein the filtering circuit further comprises a second capacitor, and the second capacitor is coupled in parallel with the first capacitor.

16. The power supply module assembly of claim 15, wherein the filtering circuit further comprises a third capacitor, one end of the third capacitor is coupled to the collector of the transistor, and the other end of the third capacitor is coupled to the emitter of the transistor.

17. The power supply module assembly of claim 12, wherein the filtering circuit further comprises a second resistor, one end of the second resistor is coupled to the collector of the transistor, and the other end of the second resistor is coupled to the emitter of the transistor.

* * * * *